US008832722B2

(12) United States Patent
Sharma et al.

(10) Patent No.: US 8,832,722 B2
(45) Date of Patent: Sep. 9, 2014

(54) MEDIA ASSET VOTING

(75) Inventors: Sean K Sharma, San Jose, CA (US); Majd Bakar, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 122 days.

(21) Appl. No.: 12/958,930

(22) Filed: Dec. 2, 2010

(65) Prior Publication Data
US 2012/0144412 A1   Jun. 7, 2012

(51) Int. Cl.
| | |
|---|---|
| *H04H 60/33* | (2008.01) |
| *H04N 21/466* | (2011.01) |
| *H04N 21/41* | (2011.01) |
| *H04N 21/81* | (2011.01) |
| *H04N 21/4363* | (2011.01) |
| *G06Q 30/02* | (2012.01) |
| *H04N 21/475* | (2011.01) |

(52) U.S. Cl.
CPC ....... *H04N 21/4126* (2013.01); *H04N 21/4661* (2013.01); *H04N 21/8186* (2013.01); *H04N 21/43637* (2013.01); *G06Q 30/0203* (2013.01); *H04N 21/4758* (2013.01)
USPC ............... 725/13; 725/24; 725/111; 725/114; 725/133

(58) Field of Classification Search
USPC ............................. 725/13, 24, 111, 114, 133
See application file for complete search history.

(56) References Cited

U.S. PATENT DOCUMENTS 6,947,966 B1 * 9/2005 Oko et al. ..................... 709/203
7,296,284 B1   11/2007 Price et al.

2004/0005900 A1 * 1/2004 Zilliacus ....................... 455/466
(Continued)

FOREIGN PATENT DOCUMENTS

| CN | 101202881 | 6/2008 |
|---|---|---|
| DE | 20316306 | 2/2004 |

(Continued)

OTHER PUBLICATIONS

Martin, et al., "neXtream: A Multi-Device, Social Approach to Video Content Consumption", Retrieved at << http://images.businessweek.com/ss/08/09/0908_microblog/1.htm >>, Consumer Communications and Networking Conference (CCNC), 2010 7th IEEE, Jan. 9-12, 2010, pp. 5.

Masthoff, Judith, "Group modeling: Selecting a sequence of television items to suit a group of viewers", Retrieved at << http://citeseerx.ist.psu.edu/viewdoc/download?doi=10.1.1.137.6240&rep=rep1&type=pdf >>, User Modeling and User-Adapted Interaction, vol. 14, No. 1, Feb. 1, 2004, pp. 1-35.

(Continued)

*Primary Examiner* — Jivka Rabovianski
(74) *Attorney, Agent, or Firm* — Micah Goldsmith; Glen Johnson; Micky Minhas

(57) ABSTRACT

In embodiments of media asset voting, a voting application is executed at a controllable device to interface the controllable device with portable devices via a wireless network. The voting application may be initiated at the controllable device by one of the portable devices. A request can be communicated from the controllable device to the portable devices to initiate each of the portable devices sending a user-selected vote for media asset selection at the controllable device. The controllable device receives the user-selected votes from one or more of the portable devices, and the voting application can aggregate each received vote to determine voting results. A media asset can then be selected at the controllable device based on the voting results. Alternatively or in addition, the voting results can be displayed for viewing on a display device that corresponds to the controllable device.

18 Claims, 8 Drawing Sheets

(56) References Cited

U.S. PATENT DOCUMENTS

| | | |
|---|---|---|
| 2004/0073924 A1 | 4/2004 | Pendakur |
| 2007/0136454 A1* | 6/2007 | Spiridellis et al. ............ 709/223 |
| 2007/0186230 A1* | 8/2007 | Foroutan ........................ 725/24 |
| 2008/0028294 A1* | 1/2008 | Sell et al. ...................... 715/234 |
| 2009/0070819 A1 | 3/2009 | Gajda et al. |
| 2010/0064306 A1* | 3/2010 | Tiongson et al. ............... 725/24 |
| 2011/0202947 A1* | 8/2011 | Gupta et al. .................... 725/14 |

FOREIGN PATENT DOCUMENTS

| | | |
|---|---|---|
| WO | WO-02093298 | 11/2002 |
| WO | WO-02093400 | 11/2002 |
| WO | WO-2008030298 | 3/2008 |

OTHER PUBLICATIONS

Robertson, et al., "Dual Device User Interface Design: PDAs and Interactive Television", Retrieved at << http://www.searchenginejournal.com/16-examples-of-huge-brands-using-twitter-for-business/7792/ >>, Conference CHI96 CHI '96 ACM Conference on Human Factors, Apr. 13-18, 1996, pp. 9.

"Most Advanced Interactive TV Remote Control Introduced", Retrieved at << http://www_beststuff.com/audiovideo/most-advanced-interactive-tv-remote-control-introduced.html >>, Retrieved Date:Sep. 27, 2010, pp. 2.

"Foreign Office Action", CN Application No. 201110415335.6, Dec. 4, 2013, 14 Pages.

* cited by examiner

MEDIA ASSET VOTING

BACKGROUND

Current viewer interaction with controllable media devices, such as televisions, television set-top boxes, and gaming consoles, typically involve a single viewer controlling the media device with a remote control. This can be problematic when some in a group of viewers want to watch different programming. Furthermore, the process of selecting new programming for viewing, such as when a program guide is displayed, can interrupt the current programming that others may be watching when a viewer browses through available programming on the display screen.

SUMMARY

This summary is provided to introduce simplified concepts of media asset voting, and the concepts are further described below in the Detailed Description. This summary is not intended to identify essential features of the claimed subject matter, nor is it intended for use in determining the scope of the claimed subject matter.

Media asset voting is described. In embodiments, a voting application is executed at a controllable device to interface the controllable device with portable devices via a wireless network. The voting application may be initiated at the controllable device by one of the portable devices. A request can be communicated from the controllable device to the portable devices to initiate each of the portable devices sending a user-selected vote for media asset selection at the controllable device. The controllable device receives the user-selected votes from one or more of the portable devices, and the voting application can aggregate each received vote to determine voting results. A media asset can then be selected at the controllable device based on the voting results. Alternatively or in addition, the voting results can be displayed for viewing on a display device that corresponds to the controllable device.

In other embodiments, it can be determined that two or more media assets have received a same number of the user-selected votes when determining the voting results. An additional request can be communicated to the portable devices for a tiebreaker vote to select one of the media assets that have received the same number of votes. The controllable device receives the tiebreaker votes from one or more of the portable devices, and the voting application aggregates each of the received tiebreaker votes to determine tiebreaker voting results. A media asset can then be selected at the controllable device based on the tiebreaker voting results.

BRIEF DESCRIPTION OF THE DRAWINGS

Embodiments of media asset voting is described with reference to the following drawings. The same numbers are used throughout the drawings to reference like features and components.

DETAILED DESCRIPTION

Media asset voting is described. In embodiments, a voting application is executed at a controllable device to interface the controllable device with portable devices, such as via a wireless network. For example, a television set-top box includes a voting application that interfaces the television set-top box with various user devices, such as a mobile phone, portable computer, and/or a remote control device. Several viewers that are together watching television may each have a portable device via which a viewer can submit a vote to select a particular channel, program, movie, game, video, music, and/or any other type of media asset. The voting application at the controllable device can communicate a request to the portable devices for user-selected votes to select media content, such as a television program, to display for viewing at the controllable device, such as on a television display device connected to a television set-top box. The viewers can browse from individual portable devices and vote to select a program for viewing without interruption to a program that may be currently displayed on the television display device for viewing.

When a request for user-selected votes is received from the controllable device at the portable devices, a voting utility can be executed by each portable device to display a voting user interface that enables a user to browse media assets that can then be selected for display at the controllable device. A user of a portable device can vote for a particular media asset by selecting a user-selectable control displayed in the voting user interface. The portable device can then communicate the user-selected vote back to the controllable device, and the voting application aggregates each received vote to determine voting results. A media asset, such as a television program or movie, can then be selected by the controllable device to display for viewing based on the voting results.

While features and concepts of the described systems and methods for media asset voting data can be implemented in any number of different environments, systems, devices, and/or various configurations, embodiments of media asset voting are described in the context of the following example devices, systems, and configurations.

Figure 1:
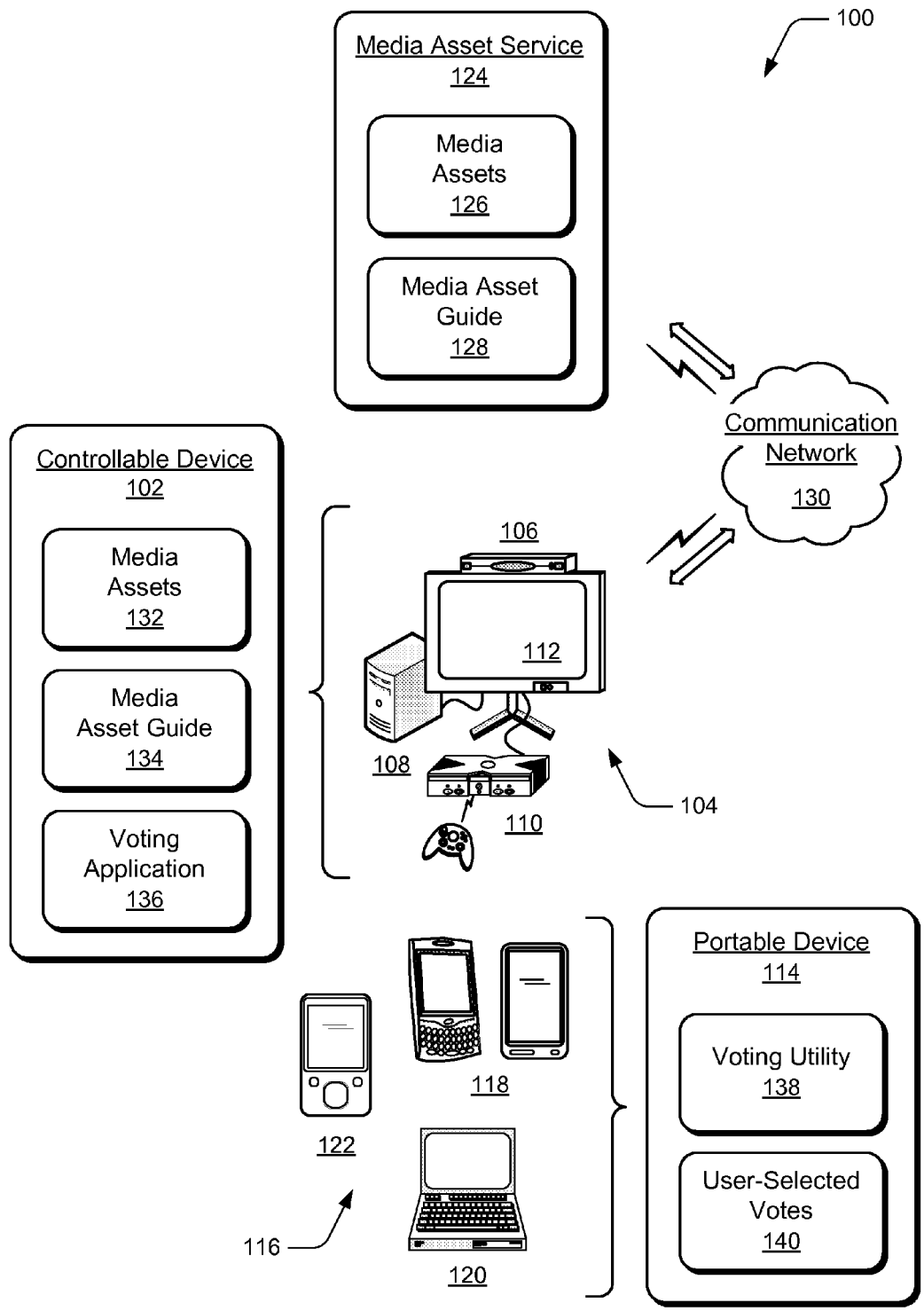
FIG. 1 illustrates an example system in which embodiments of media asset voting can be implemented.

FIG. 1 illustrates an example system 100 in which various embodiments of media asset voting can be implemented. The example system 100 includes an example controllable device 102, which may be configured as any type of device 104, and may also be referred to as user devices and/or client devices. A controllable device 104 can be implemented as any one or combination of a television client device 106 (e.g., a television set-top box, a digital video recorder (DVR), etc.), a computer device 108, a gaming system 110, an appliance device, an electronic device, an advanced networked television device, and/or as any other type of controllable device that may be configured to be controlled by a portable device. A client system can include a respective controllable device and display device 112 that together render or playback any form of audio, video, and/or image media content and media assets. The display device 112 can be implemented as any type of a television, high definition television (HDTV), LCD, or similar display system.

The example system 100 also includes an example portable device 114, which may be configured as any type of portable device 116 that can be implemented to receive, display, and/or communicate data for input control of controllable devices. The various portable devices 116 can include wireless devices implemented to receive and/or communicate wireless data, such as any one or combination of a mobile phone 118 (e.g., cellular, VoIP, WiFi, etc.), a portable computer device 120, a media device 122 (e.g., a personal media player, portable media player, etc.), and/or any other wireless device that can receive media content in any form of audio, video, and/or image data. Each of the various portable devices can include an integrated display and/or an integrated touch-screen, as well as selectable input controls via which a user can input data and/or selections.

Any of the various controllable devices 104 and/or portable devices 116 can be implemented with one or more processors, communication components, wired and/or wireless interfaces, data inputs, memory components, signal processing and control circuits, and a media content rendering system. Additionally, any of the various controllable devices 104 and/or portable devices 116 can be implemented with any number and combination of differing components as further described with reference to the example device shown in FIG. 10.

The example system 100 also includes a media asset service 124 that can include media content servers to communicate, or otherwise distribute, media content and/or other data to any number of the various controllable devices 104 and portable devices 116. The media asset service includes media assets 126 and a media asset guide 128 that includes a listing of the media assets. Additionally, the media asset service may be implemented as a subscription-based service from which any of the various devices can request media assets to download and display for viewing, or otherwise render for playback.

The media assets 126 can include any type of audio, video, and/or image data received from any type of media content source or data source. As described throughout, media assets are media content, and media assets can include music (e.g., digital music files of songs), television programming, movies, on-demand media assets, interactive games, network-based applications, and any other audio, video, and/or image data (e.g., to include program guide data, user interface data, advertising content, closed-caption data, content metadata, search results and/or recommendations, etc.).

Any of the services and devices can communicate via a communication network 130, which can be implemented to include a wired and/or wireless network that facilitates media asset distribution and data communication. The communication network can also be implemented using any type of network topology and/or communication protocol, and can be represented or otherwise implemented as a combination of two or more networks. The communication network may also include a mobile operator network that is managed by a communication service provider, such as a cell-phone provider and/or Internet service provider, to facilitate mobile data and/or voice communications for any type of a wireless device or mobile phone (e.g., cellular, VoIP, Wi-Fi, etc.).

The example controllable device 102 can receive and playback media assets 132 that are received from the media asset service 124 (e.g., as the media assets 126) or from any other media content source. For example, the television client device 106 can receive a television program or movie for display on the display device 112. The controllable device can also receive a media asset guide 134 from the media asset service (e.g., as the media asset guide 128) that provides a listing of the media assets available for selection and viewing by a user at the controllable device. The controllable device also includes a voting application 136 that can be implemented as computer-executable instructions, such as a software application, and executed by one or more processors to implement the various embodiments described herein.

The portable device 114 includes a voting utility 138 that can also be implemented as computer-executable instructions, such as a software application, and executed by one or more processors to implement the various embodiments described herein. For example, the voting utility configures the portable device to interface with the controllable device 102 via a wireless network. The voting utility can be implemented to generate a command that is communicated by the portable device to the controllable device to initiate the voting application 136 at the controllable device. Alternatively, the voting application at the controllable device may also be initiated by a controller of the controllable device, such as with a television remote control device.

The voting application 136, when initiated, is implemented to communicate a request or command to the portable devices 116 to initiate each of the portable devices sending a user-selected vote 140 for media asset selection at the controllable device 102. When the request from the voting application is received, such as at the portable device 114, the voting utility 138 is implemented to display a voting user interface to enable user browsing of the media assets that can be selected for display at the controllable device. The voting utility can determine the media assets that are available for selection by accessing the media asset guide 134 at the controllable device 102 and/or the media asset guide 128 that is available from the media asset service 124 via communication network 130.

Figure 2:
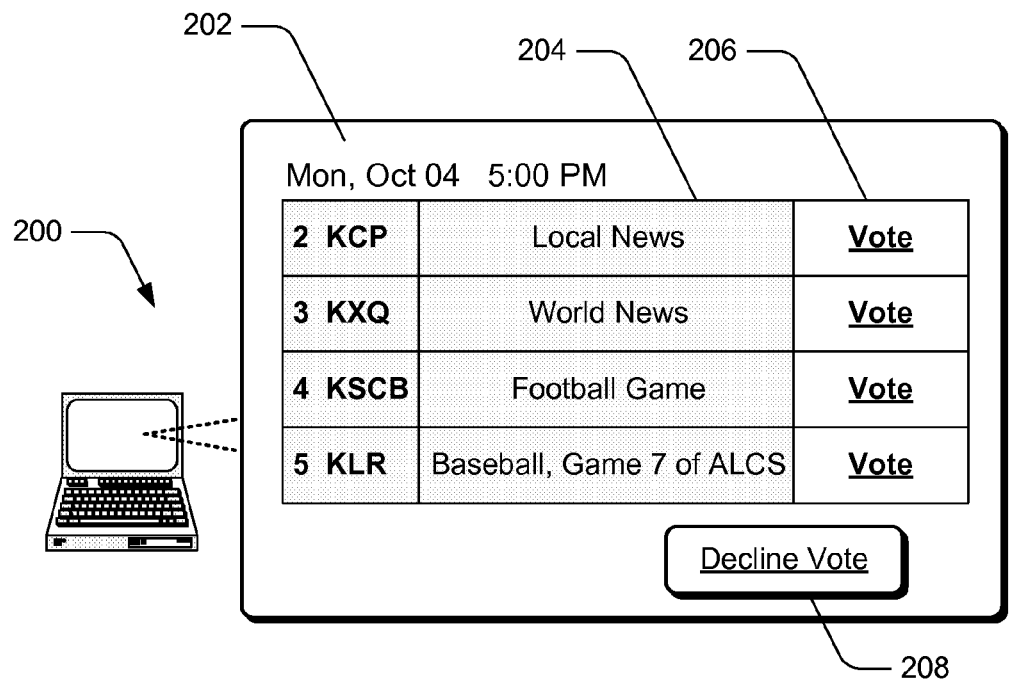
FIG. 2 illustrates an example of a voting user interface displayed at a portable device in accordance with one or more embodiments.

FIG. 2 illustrates an example portable device 200 displaying a voting user interface 202. The voting user interface includes a listing of media assets 204 (e.g., Local News, World News, Football, and Baseball) that can be selected for viewing and displayed at the controllable device 102, as described with reference to FIG. 1. The voting user interface can be displayed for viewing on an integrated display of each portable device that includes a voting utility. In an embodiment, the voting user interface 202 enables a user to vote for a listed media asset 204 at the portable device 200. The voting utility enables multiple viewers to each browse through programming choices from individual portable devices and vote to select a program for viewing without interruption to a program that may be currently displayed for viewing at the controllable device.

The voting utility 138 at a portable device is implemented to receive a user-selected vote of one of the media assets 204 when selected via the voting user interface 202 that includes user-selectable vote controls 206. In this example, the vote controls are displayed proximate corresponding media assets 204 in the voting user interface 202, and a user-selectable vote control can be selected by a user to vote for the corresponding media asset. For example, a user can select the vote control displayed proximate the football game to vote having the football game selected and displayed for viewing at the controllable device 102. A user-selected vote at a portable device can be communicated to the voting application 136 at the controllable device 102. Note that other techniques to generate user-selected votes at a portable device may be employed, as well as to communicate votes from portable devices to a controllable device.

The voting application 136 at the controllable device 102 receives the user-selected votes from one or more of the portable devices 116 and aggregates each received vote to determine voting results, such as the number of received votes for each of the media assets that receive a vote. The voting results may include an ordered listing of the media assets that received at least one vote, and the listing may be ordered based on the total number of votes received for each media asset.

The voting results can be determined when receiving a vote or a decline vote from each of the portable devices 116. In this way, each user of a portable device is given the chance to submit a vote to select a media asset. In the event that a user of a portable device does not wish to vote for a media asset, a decline vote may be received at the portable device 114 and communicated to the controllable device 102 to indicate that a particular user associated with the portable device does not wish to take part in the voting. For example, the voting user interface 202 includes a selectable decline vote control 208 that can be selected by a user to communicate a decline vote to the voting application 136 at the controllable device. Alternative to a decline vote, a timeout period for voting may be implemented, and once the timeout period has expired, a portable device that does not communicate a vote to the controllable device is considered a decline vote. The voting application at the controllable device can establish that each portable device submit a vote within a designated time duration when requesting the user-selected votes.

Figure 3:
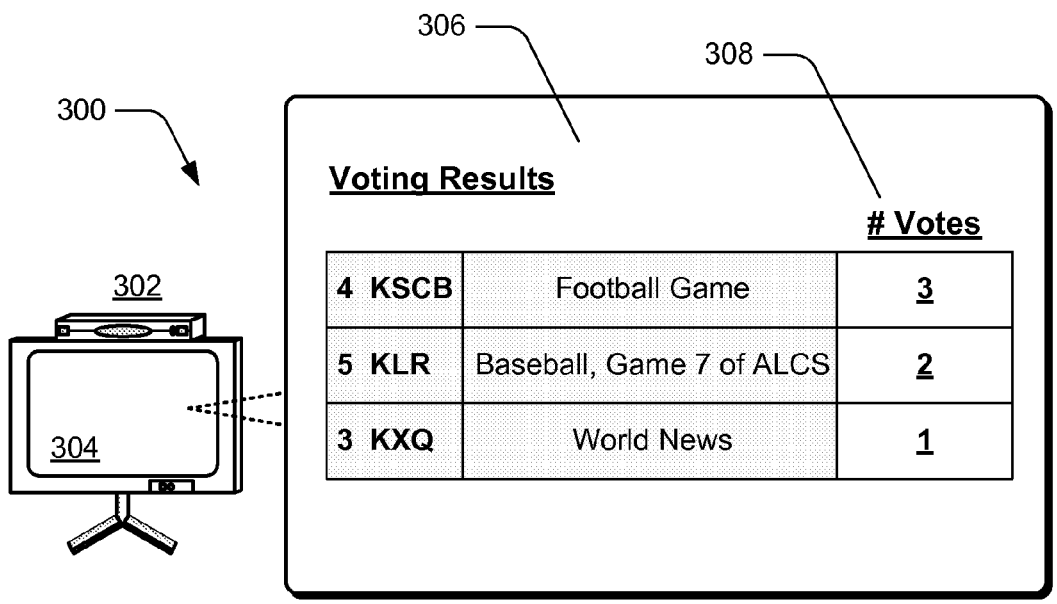
FIG. 3 illustrates an example of voting results displayed at a controllable device in accordance with one or more embodiments.

FIG. 3 illustrates a controllable device 300, which in this example is a television client device 302 and a corresponding display device 304. In an embodiment, the voting results that are received by a voting application at a controllable device can be displayed for viewing on a display device that corresponds to the controllable device. In this example, the television client device renders voting results 306 for viewing on the display device, and the voting results include the number of votes 308 for each of the various media assets, or the most voted-for media assets. The voting results indicate that the voting application corresponding to controllable device 300 has received three votes for the football game, two votes for the baseball game, and one vote for the news. In an embodiment, a user or device identifier may also be displayed proximate the voting results for all of the viewers to see who voted for which media assets. The voting application can also be implemented to update the voting results 306 in real-time as each user-selected vote is received from the portable devices.

After the voting results are determined, the voting application 136 at the controllable device is implemented to select a media asset to display for viewing based on the voting results, such as the media asset that received the most user-selected votes. For example, the voting application at the controllable device 300 can select the football game because the football game received more votes than the other media assets. Alternatively, the voting application may be implemented to select a media asset based at least in part on other criteria. For example, a first user's vote may be weighted more heavily than a second user's vote when determining the voting results.

Additionally, the voting application 136 can be implemented to determine a media asset selection when disparate user-selected votes are received. For example, each viewer in a group may vote for a different television program, and none of the votes are the same, or for the same program. In an embodiment, the voting application can then determine and select a television program for the group of viewers based on any determined criteria corresponding to the voted television programs, such as subject matter, genre, channel, characters, and/or any other determined criteria. When all of the user-selected votes for media assets are different, the voting application can select a different media asset that may be liked by all of the viewers, and the selected media asset is not one of the voted-for media assets.

Figure 4:
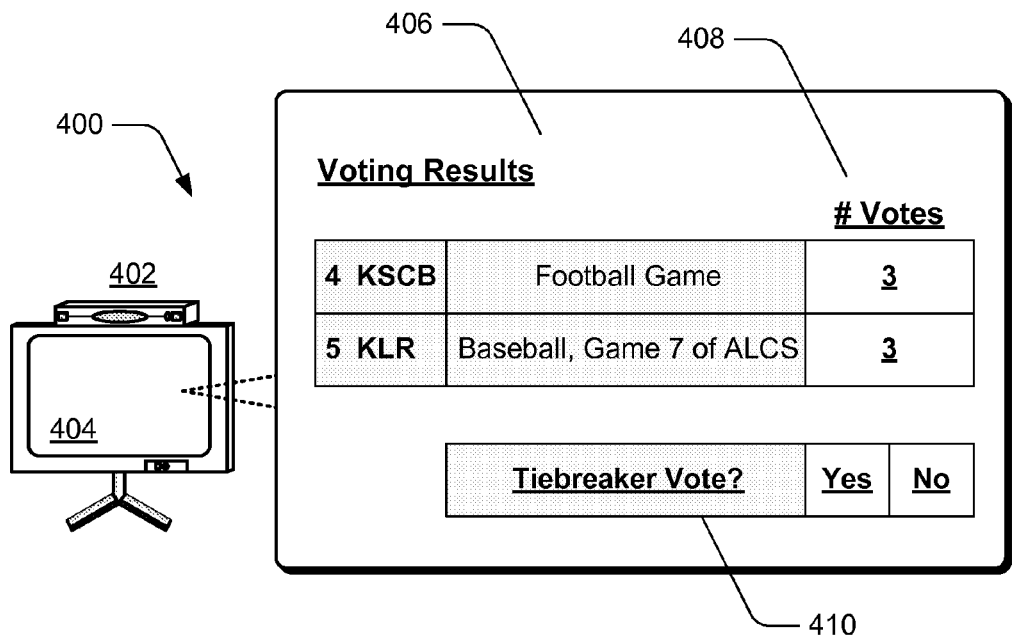
FIG. 4 illustrates an additional example of voting results displayed at a controllable device in accordance with one or more embodiments.

FIG. 4 illustrates a controllable device 400, which in this example is a television client device 402 and a corresponding display device 404. In an embodiment, the voting application at a controllable device can initiate a tiebreaker vote when two or more media assets have received the same number of user-selected votes. In this example, the television client device renders voting results 406 for viewing on the display device, and the voting results indicate that the same number of votes 408 have been received for both the football game and the baseball game.

The voting application 136 at the controllable device is implemented to communicate an additional request to the portable devices 116 for a tiebreaker vote to select one of the media assets that have received the same number of user-selected votes. In an embodiment, a tiebreaker vote can be initiated by one of the portable devices or by a controller corresponding to the controllable device. For example, a user with one of the portable devices may select whether or not to initiate the tiebreaker vote by selecting a displayed control 410, which can be selected using a portable device or a remote control device. If a tiebreak vote is not initiated, the voting application may automatically select one of the media assets to display for viewing.

Figure 5:
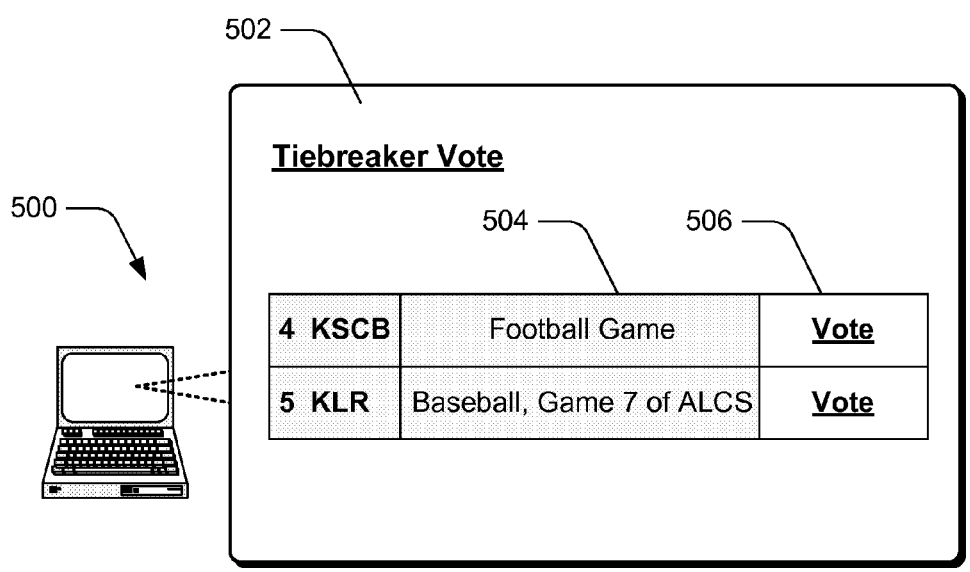
FIG. 5 illustrates an additional example of a voting user interface displayed at a portable device in accordance with one or more embodiments.

FIG. 5 illustrates a portable device 500 that displays a voting user interface 502 that includes a list of media assets 540 that have received the same number of votes. When a tiebreaker vote is initiated, each portable device 116 can receive a list of the media assets that have received the same number of votes, and the list can be displayed in a voting user interface at each portable device. In this example, the list includes the football game and the baseball game which have both received the same number of user-selected votes. The voting user interface 502 enables a user to vote for one of the media assets by selecting a user-selectable vote control 506 that corresponds to the voted media asset.

The voting utility 138 at a portable device is implemented to receive a user-selected tiebreaker vote and communicate the tiebreaker vote to the voting application at the controllable device. The voting application 136 at the controllable device receives the tiebreaker votes from one or more of the portable devices and aggregates each of the received tiebreaker votes to determine tiebreaker voting results. The voting application can then select a media asset to display for viewing based on the tiebreaker voting results, such as the media asset that received the most tiebreaker votes from users at the portable devices.

Example methods 600-900 are described with reference to respective FIGS. 6-9 in accordance with one or more embodiments of media asset voting. Generally, any of the functions, methods, procedures, components, and modules described herein can be implemented using software, firmware, hardware (e.g., fixed logic circuitry), manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The program code can be stored in one or more computer-readable memory devices, both local and/or remote to a computer processor. The methods may also be practiced in a distributed computing environment by multiple computer devices. Further, the features described herein are platform-independent and can be implemented on a variety of computing platforms having a variety of processors.

Figure 6:
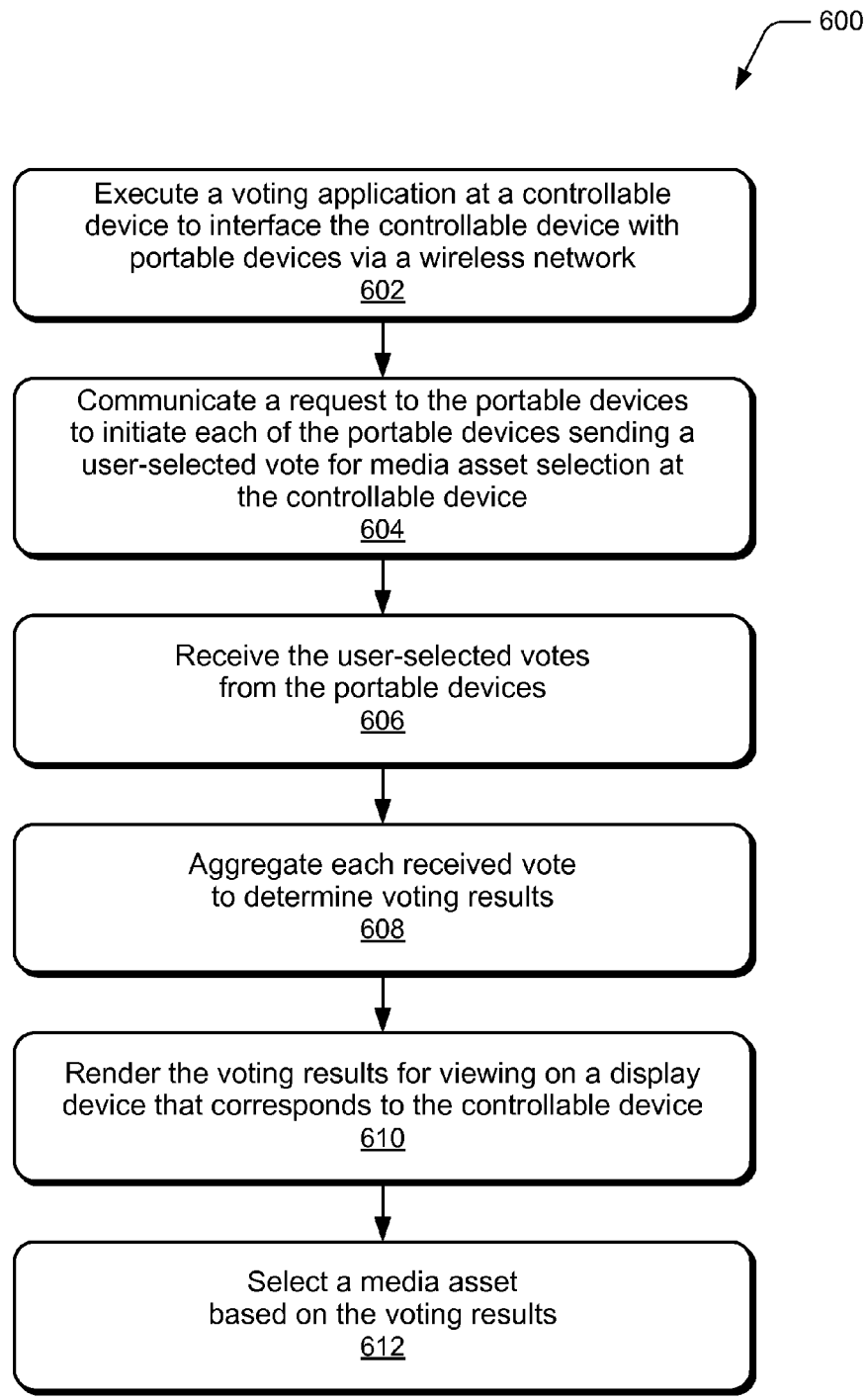
FIGS. 6-9 illustrate example method(s) of media asset voting in accordance with one or more embodiments.

FIG. 6 illustrates example method(s) 600 of media asset voting, and is described with reference to a controllable device that interfaces with portable devices. The order in which the method blocks are described are not intended to be construed as a limitation, and any number of the described method blocks can be combined in any order to implement a method, or an alternate method.

At block 602, a voting application is executed by a controllable device to interface the controllable device with portable devices via a wireless network. For example, the controllable device 102 (FIG. 1) executes the voting application 136 to interface the controllable device with portable devices 116 via a wireless network. The voting application can be executed as a service at the controllable device or as a service at the media asset service 124. The voting application can be initiated by one of the portable devices, such as when the voting utility 138 communicates a command to the controllable device. Alternatively, the voting application can be initiated by a controller of the controllable device, such as with a television remote control device. When executed, the voting application interfaces the controllable device with a voting utility that is executed at each of the portable devices.

At block 604, a request is communicated to the portable devices to initiate each of the portable devices sending a user-selected vote for media asset selection at the controllable device. For example, the voting application 136 communicates a request to the portable devices 116 to initiate each of the portable devices sending a user-selected vote 140 for media asset selection at the controllable device 102.

At block 606, the user-selected votes are received from one or more of the portable devices via the wireless network. For example, the controllable device 102 receives the user-selected votes 140 from one or more of the portable devices 116. In an embodiment, a decline vote can be received from a portable device indicating that a user at the portable device has declined to vote for media asset selection. At block 608, each received vote is aggregated to determine voting results. For example, the voting application 136 at the controllable device 102 aggregates each received vote to determine voting results. The voting results are determined responsive to receiving a user-selected vote or a decline vote from each of the portable devices, or are determined after a timeout period for voting has expired.

At block 610, the voting results are rendered for viewing on a display device that corresponds to the controllable device. For example, the voting results 306 (FIG. 3) are displayed for viewing on the display device 304 that corresponds to the controllable device 300. At block 612, a media asset is selected based on the voting results. For example, the voting application 136 at the controllable device 102 selects a media asset to display for viewing based on the voting results, such as the media asset that received the most user-selected votes.

Figure 7:
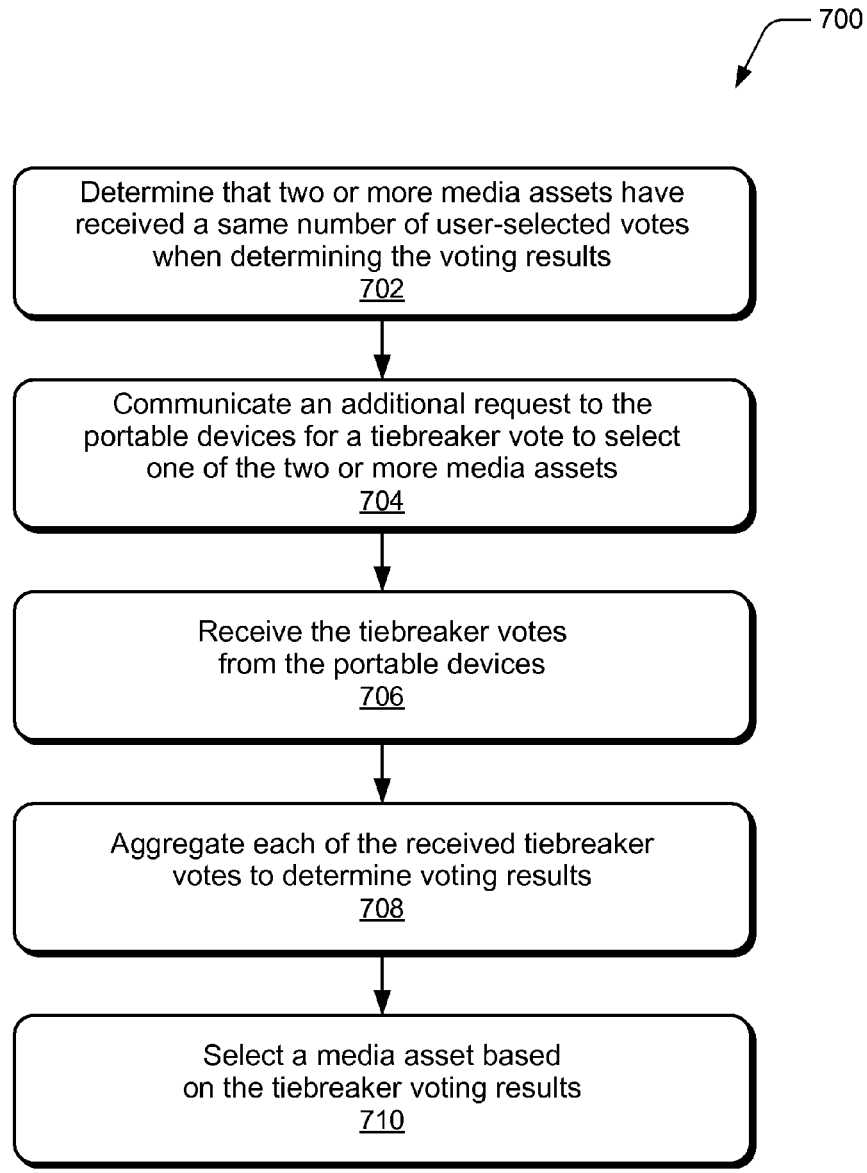

FIG. 7 illustrates example method(s) 700 of media asset voting, and is described with reference to a controllable device that interfaces with portable devices. In embodiments, method 700 can be implemented after the voting results are determined at block 608 of FIG. 6. The order in which the method blocks are described are not intended to be construed as a limitation, and any number of the described method blocks can be combined in any order to implement a method, or an alternate method.

At block 702, a determination is made that two or more media assets have received a same number of user-selected votes, such as when determining the voting results. For example, the voting application 136 at the controllable device 102 (FIG. 1) determines that a number of media assets 132 have received a same number of user-selected votes from users of the portable devices 116.

At block 704, an additional request is communicated to the portable devices for a tiebreaker vote to select one of the two or more media assets and, at block 706, the tiebreaker votes are received from one or more of the portable devices. For example, the voting application 136 communicates an additional request to the portable devices 116 for a tiebreaker vote to select one of the media assets, and the controllable device 102 receives the tiebreaker votes from one or more of the portable devices to select one of the media assets.

At block 708, each of the received tiebreaker votes is aggregated to determine tiebreaker voting results and, at block 710, a media asset is selected based on the tiebreaker voting results. For example, the voting application 136 at the controllable device 102 aggregates each of the received tiebreaker votes to determine tiebreaker voting results, and then selects a media asset to display for viewing on the display device 112 that corresponds to the controllable device.

Figure 8:
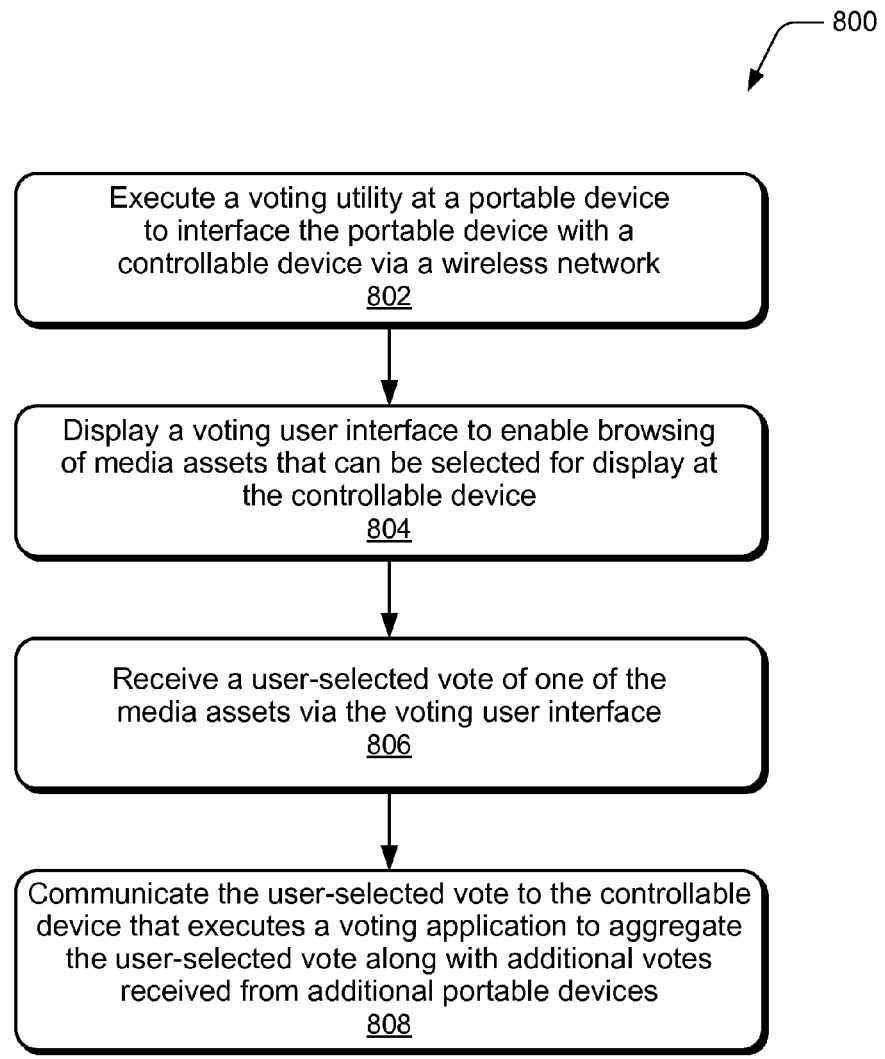

FIG. 8 illustrates example method(s) 800 of media asset voting, and is described with reference to a portable device that interfaces with a controllable device. The order in which the method blocks are described are not intended to be construed as a limitation, and any number of the described method blocks can be combined in any order to implement a method, or an alternate method.

At block 802, a voting utility is executed by a portable device to interface the portable device with a controllable device via a wireless network. For example, the portable device 114 (FIG. 1) executes the voting utility 138 to interface the portable device with a controllable device 102 via a wireless network. The voting utility can be executed as a service on the portable device, and the voting utility interfaces the portable device with the voting application 136 that is executed by a controllable device 102 or at the media asset service 124.

At block 804, a voting user interface is displayed to enable browsing of media assets that can be selected for display at the controllable device. For example, the voting utility 138 at the portable device 114 displays a voting user interface 202 (FIG. 2) to enable browsing of media assets 204 that can be selected at the controllable device. The voting utility determines the media assets that are available for selection by accessing the media asset guide 134 at the controllable device 102 and/or the media asset guide 128 at the media asset service 124.

At block 806, a user-selected vote of one of the media assets is received via the voting user interface. For example, the voting utility 138 at the portable device 114 receives a user-selected vote of one of the media assets 204 when a user selects a user-selectable vote control 206 displayed in the voting user interface 202. Alternatively, a decline vote can be received by the voting utility that indicates a user of the portable device does not want to participate in voting for media asset selection.

At block 808, the user-selected vote is communicated to the controllable device that executes a voting application to aggregate the user-selected vote along with one or more additional votes received from one or more additional portable devices. For example, the voting utility 138 at the portable device 114 communicates the user-selected vote 140 (or the decline vote) to the controllable device 102 that executes the voting application 136 to aggregate the user-selected vote along with one or more additional votes received from one or more additional portable devices.

Figure 9:
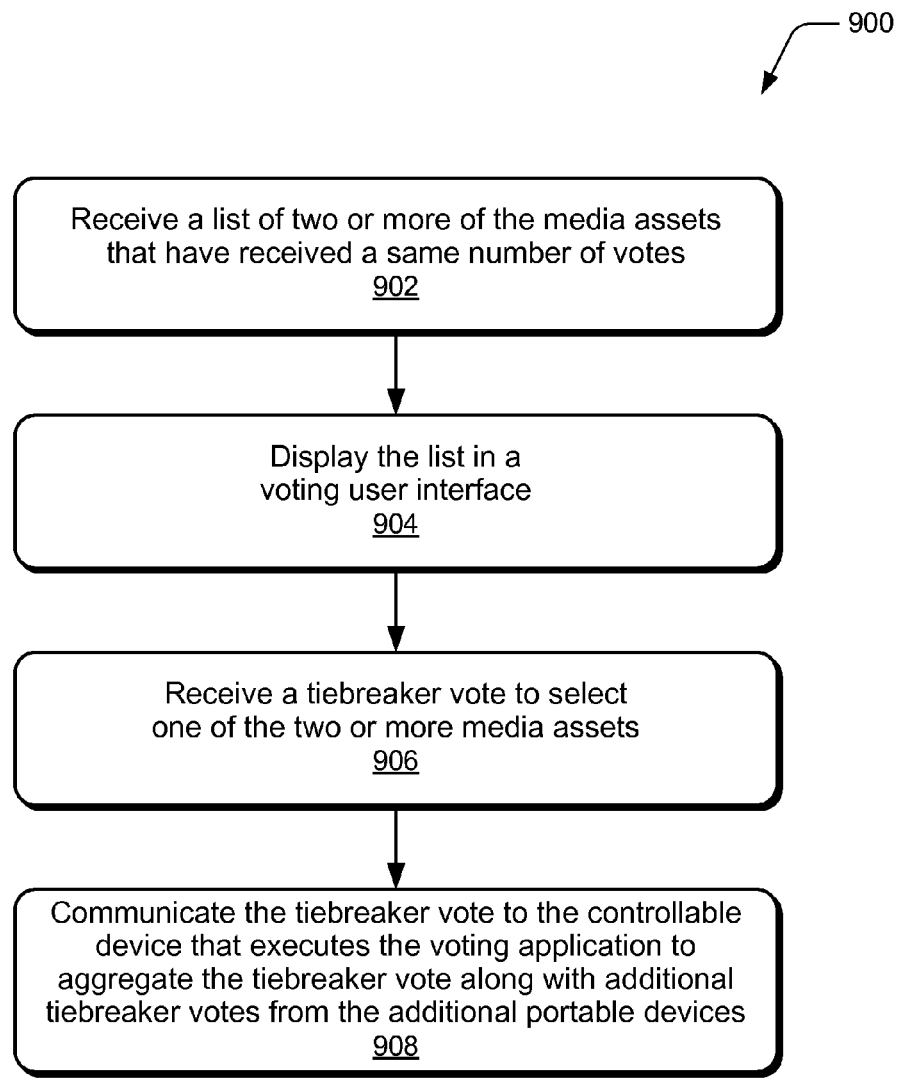

FIG. 9 illustrates example method(s) 900 of media asset voting, and is described with reference to a portable device that interfaces with a controllable device. In embodiments, method 900 can be implemented after the user-selected vote is communicated to the controllable device at block 808 of FIG. 8. The order in which the method blocks are described are not intended to be construed as a limitation, and any number of the described method blocks can be combined in any order to implement a method, or an alternate method.

At block 902, a list of two or more media assets that have received a same number of votes is received and, at block 904, the list is displayed in a voting user interface. For example, the voting utility 138 at the portable device 114 (FIG. 1) receives a list of the media assets that have received a same number of votes, and the tiebreaker vote of the media assets 504 (FIG. 5) is displayed for viewing in the voting user interface 502 on the display device of the portable device 500.

At block 906, a tiebreaker vote to select one of the two or more media assets is received via the voting user interface. For example, the voting utility 138 receives a tiebreaker vote when a user selects a user-selectable tiebreaker vote control 506 that corresponds to one of the media assets 504 displayed for a tiebreaker vote in the voting user interface 502.

At block 908, the tiebreaker vote is communicated to the controllable device that executes the voting application to aggregate the tiebreaker vote along with additional tiebreaker votes from additional portable devices. For example, the voting utility 138 at the portable device 114 communicates the tiebreaker vote to the controllable device 102 that executes the voting application 136 to aggregate the tiebreaker vote along with one or more additional tiebreaker votes from one or more of the additional portable devices.

Figure 10:
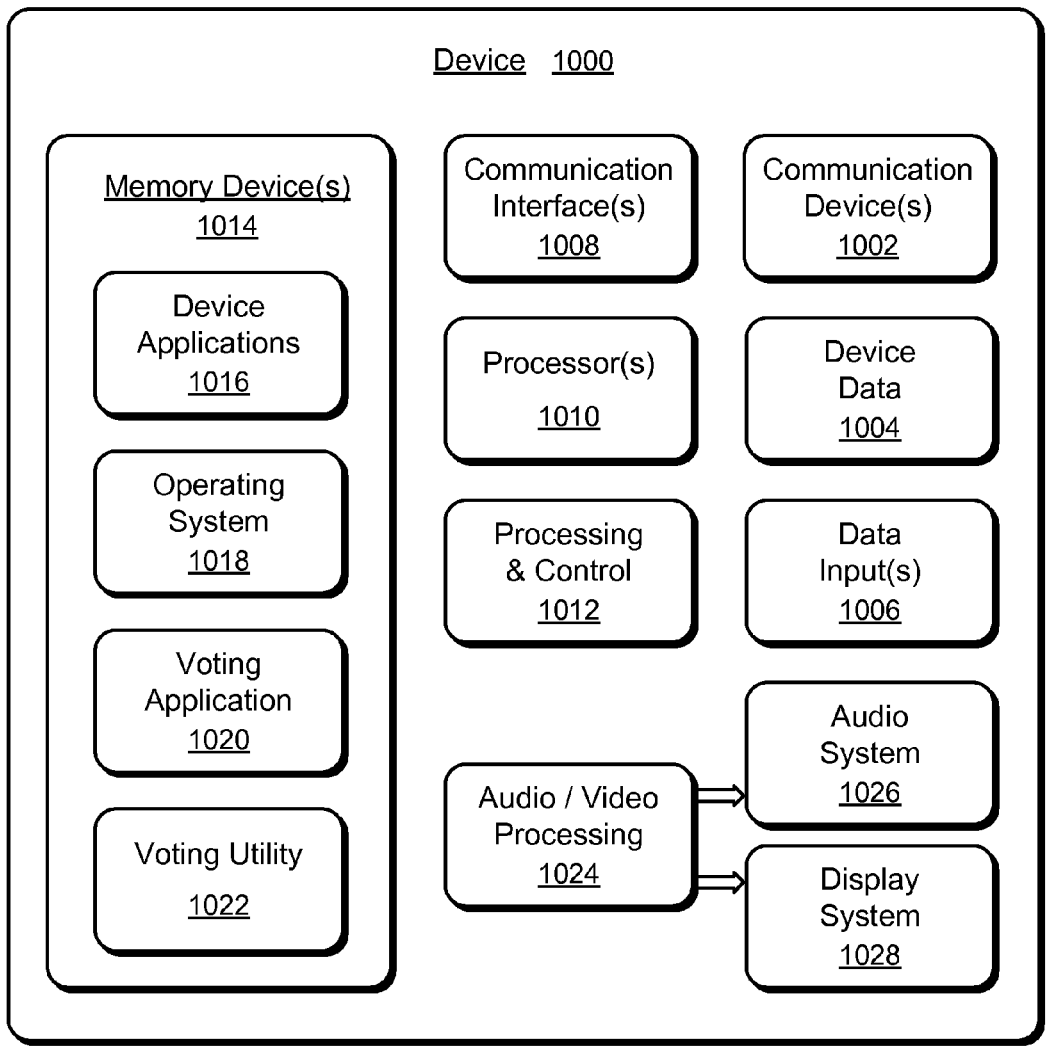
FIG. 10 illustrates various components of an example device that can implement embodiments of media asset voting.

FIG. 10 illustrates various components of an example device 1000 that can be implemented as any of the devices, or services implemented by devices, described with reference to the previous FIGS. 1-9. In embodiments, the device may be implemented as any one or combination of a fixed or mobile device, in any form of a consumer, computer, server, portable, user, communication, phone, navigation, television, appliance, gaming, media playback, and/or electronic device. The device may also be associated with a user (i.e., a person) and/or an entity that operates the device such that a device describes logical devices that include users, software, firmware, hardware, and/or a combination of devices.

The device 1000 includes communication devices 1002 that enable wired and/or wireless communication of device data 1004, such as received data, data that is being received, data scheduled for broadcast, data packets of the data, etc. The device data or other device content can include configuration settings of the device, media content stored on the device, and/or information associated with a user of the device. Media content stored on the device can include any type of audio, video, and/or image data. The device includes one or more data inputs 1006 via which any type of data, media content, and/or inputs can be received, such as user-selectable inputs, messages, communications, music, television content, recorded video content, and any other type of audio, video, and/or image data received from any content and/or data source.

The device 1000 also includes communication interfaces 1008, such as any one or more of a serial, parallel, network, or wireless interface. The communication interfaces provide a connection and/or communication links between the device and a communication network by which other electronic, computing, and communication devices communicate data with the device.

The device 1000 includes one or more processors 1010 (e.g., any of microprocessors, controllers, and the like) which process various computer-executable instructions to control the operation of the device. Alternatively or in addition, the device can be implemented with any one or combination of software, hardware, firmware, or fixed logic circuitry that is implemented in connection with processing and control circuits which are generally identified at 1012. Although not shown, the device can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The device 1000 also includes one or more memory devices (e.g., computer-readable storage media) 1014 that enable data storage, such as random access memory (RAM), non-volatile memory (e.g., read-only memory (ROM), flash memory, etc.), and a disk storage device. A disk storage device may be implemented as any type of magnetic or optical storage device, such as a hard disk drive, a recordable and/or rewriteable disc, and the like. The device may also include a mass storage media device.

Computer readable media can be any available medium or media that is accessed by a computing device. By way of example, and not limitation, computer readable media may comprise storage media and communications media. Storage media include volatile and non-volatile, removable and non-removable media implemented in any method or technology for storage of information, such as computer-readable instructions, data structures, program modules, or other data. Storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by a computer.

Communication media typically embody computer-readable instructions, data structures, program modules, or other data in a modulated data signal, such as carrier wave or other transport mechanism. Communication media also include any information delivery media. The term modulated data signal means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

A memory device 1014 provides data storage mechanisms to store the device data 1004, other types of information and/or data, and various device applications 1016. For example, an operating system 1018 can be maintained as a software application with a memory device and executed on the processors. The device applications may also include a device manager, such as any form of a control application, software application, signal processing and control module, code that is native to a particular device, a hardware abstraction layer for a particular device, and so on.

In this example, the device applications 1016 include a voting application 1020, such as when device 1000 is implemented as a controllable device. Alternatively or in addition, the device applications include a voting utility 1022, such as when the device is implemented as a portable device. The voting application and the voting utility are shown as software modules and/or computer applications. Alternatively or in addition, the voting application and the voting utility can be implemented as hardware, software, firmware, fixed logic, or any combination thereof.

The device 1000 also includes an audio and/or video processing system 1024 that generates audio data for an audio system 1026 and/or generates display data for a display system 1028. The audio system and/or the display system may include any devices that process, display, and/or otherwise render audio, video, display, and/or image data. Display data and audio signals can be communicated to an audio device and/or to a display device via an RF (radio frequency) link, S-video link, composite video link, component video link, DVI (digital video interface), analog audio connection, or other similar communication link. In implementations, the audio system and/or the display system are external components to the device. Alternatively, the audio system and/or the display system are integrated components of the example device.

Although embodiments of media asset voting has been described in language specific to features and/or methods, the subject of the appended claims is not necessarily limited to the specific features or methods described. Rather, the specific features and methods are disclosed as example implementations of media asset voting.

The invention claimed is:

1. A method implemented by a controllable device, the method comprising:
    executing a voting application with a processor of the controllable device, the voting application configured to interface the controllable device with portable devices via a wireless network;
    communicating a request to the portable devices to initiate each of the portable devices displaying a voting user interface that includes a listing of media assets that can be displayed for viewing at the controllable device, the voting user interface further including a vote control proximate each of the media assets in the listing of media assets, the vote control enabling each portable device to receive a user-selected vote for one of the media assets in the listing of media assets, the voting user interface further including a decline vote control enabling each portable device to receive a user-selected decline vote;
    receiving the user-selected votes and the user-selected decline votes from one or more of the portable devices via the wireless network;
    aggregating each received vote to determine voting results;
    determining that two or more media assets have received a same number of the user-selected votes when determining the voting results;
    communicating an additional request to the portable devices for a tiebreaker vote to select one of the two or more media assets that have received the same number of user-selected votes;
    receiving the tiebreaker votes from one or more of the portable devices via the wireless network;
    aggregating each of the received tiebreaker votes to determine tiebreaker voting results; and
    selecting a media asset to display for viewing at the controllable device based on the tiebreaker voting results, the media asset selected from the two or more media assets that received the most tiebreaker votes, the selecting the media asset further comprising automatically selecting one of the two or more media assets that have received the same number of the user-selected votes if no tiebreaker votes are received.

2. A method as recited in claim 1, further comprising rendering the voting results for viewing on a display device that corresponds to the controllable device.

3. A method as recited in claim 2, wherein the voting results rendered for viewing on the display device includes a number of votes received for each media asset that received at least one vote.

4. A method as recited in claim 1, wherein the media asset is selected based on the voting results that indicate the media asset received the most user-selected votes.

5. A method as recited in claim 1, wherein the media asset is selected based on criteria corresponding to voted media assets from the user-selected votes.

6. A method as recited in claim 5, wherein the media asset that is selected at the controllable device is not a voted media asset that corresponds to any of the user-selected votes.

7. A method as recited in claim 1, wherein the voting application is initiated responsive to receiving a command to execute the voting application from one of the portable devices, or from a controller that corresponds to the controllable device.

8. A controllable device comprising:
    at least a memory and a processor to implement a voting application, the voting application configured to interface the controllable device with portable devices via a wireless network, the voting application further configured to:
    communicate a request to the portable devices to initiate each of the portable devices sending a user-selected vote for media asset selection at the controllable device or a decline vote;
    receive the user-selected votes or decline votes from one or more of the portable devices via the wireless network;
    aggregate each received user-selected vote or decline vote to determine voting results;
    determine that two or more media assets have received a same number of the user-selected votes when determining the voting results;
    communicate an additional request to the portable devices for a tiebreaker vote to select one of the two or more media assets that have received the same number of user-selected votes;
    receive the tiebreaker votes from one or more of the portable devices via the wireless network;
    aggregate each of the received tiebreaker votes to determine tiebreaker voting results; and
    select a media asset to display for viewing at the controllable device based on the tiebreaker voting results, the media asset selected by the voting application from the two or more media assets that received the most tiebreaker votes, the voting application configured to automatically select one of the two or more media assets that received the same number of the user-selected votes if no tiebreaker votes are received.

9. A controllable device as recited in claim 8, wherein the voting application is further configured to render the voting results for viewing on a display device that corresponds to the controllable device.

10. A controllable device as recited in claim 8, wherein the media asset is selected based on the voting results that indicate the media asset received the most user-selected votes.

11. A controllable device as recited in claim 8, wherein the media asset is selected based on criteria corresponding to voted media assets from the user-selected votes.

12. A controllable device as recited in claim 8, wherein the request communicated to the portable devices further initiates each of the portable devices to display a voting user interface that includes a listing of media assets that can be displayed for viewing at the controllable device, the voting user interface further including a vote control proximate each of the media assets in the listing of media assets, the vote control enabling each portable device to receive the user-selected vote media asset selection at the controllable device.

13. A controllable device as recited in claim 12, wherein the voting user interface further includes a selectable decline vote control that enables each portable device to receive the decline vote.

14. A controllable device as recited in claim 8, wherein the voting application is initiated responsive to the controllable device receiving a command to execute the voting application from one of the portable devices, or from a controller that corresponds to the controllable device.

15. A computer storage device having computer-readable instructions stored thereon that, when executed by a processor of a controllable device, perform a method comprising:
communicating a request to portable devices to initiate each of the portable devices sending a user-selected vote for media asset selection at the controllable device;
receiving the user-selected votes from one or more of the portable devices via the wireless network;
aggregating each received vote to determine voting results;
determining that two or more media assets have received a same number of the user-selected votes;
communicating an additional request to the portable devices for a tiebreaker vote to select one of the two or more media assets that have received the same number of user-selected votes;
receiving the tiebreaker votes from one or more of the portable devices via the wireless network;
aggregating each of the received tiebreaker votes to determine tiebreaker voting results; and
selecting a media asset to display for viewing at the controllable device based on the tiebreaker voting results, the media asset selected from the two or more media assets that received the most tiebreaker votes, the selecting the media asset further comprising automatically selecting one of the two or more media assets that have received the same number of the user-selected votes if no tiebreaker votes are received.

16. A computer storage device as recited in claim 15, wherein the voting results are determined responsive to:
receiving the user-selected vote or a decline vote from each of the portable devices; or
determining that a timeout period for voting has expired.

17. A computer storage device as recited in claim 15, wherein the voting results include an ordered listing of media assets that received at least one vote, and wherein the ordered listing is ordered based on a total number of votes received for each media asset in the ordered listing.

18. A computer storage device as recited in claim 15, wherein the computer-readable instructions, when executed by the processor of the controllable device, perform a method further comprising rendering the voting results for viewing on a display device that corresponds to the controllable device.

* * * * *